United States Patent
Bohländer

(10) Patent No.: US 11,581,822 B2
(45) Date of Patent: Feb. 14, 2023

(54) CIRCUIT ARRANGEMENT FOR A CONVERTER, METHOD FOR OPERATING A CONVERTER AND AIRCRAFT HAVING A CIRCUIT ARRANGEMENT OF THIS TYPE

(71) Applicant: Rolls-Royce Deutschland Ltd & Co KG, Blankenfelde-Mahlow (DE)

(72) Inventor: Marco Bohländer, Hirschaid (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 3 days.

(21) Appl. No.: 16/964,905

(22) PCT Filed: Dec. 10, 2018

(86) PCT No.: PCT/EP2018/084193
§ 371 (c)(1),
(2) Date: Jul. 24, 2020

(87) PCT Pub. No.: WO2019/145081
PCT Pub. Date: Aug. 1, 2019

(65) Prior Publication Data
US 2021/0044217 A1 Feb. 11, 2021

(30) Foreign Application Priority Data
Jan. 26, 2018 (DE) .................... 10 2018 201 202.4

(51) Int. Cl.
*H02N 13/00* (2006.01)
*H02M 7/5387* (2007.01)
(Continued)

(52) U.S. Cl.
CPC .......... *H02M 7/5387* (2013.01); *B64D 31/14* (2013.01); *H02M 1/14* (2013.01); *H02P 27/06* (2013.01)

(58) Field of Classification Search
CPC ..... H02P 27/06; H02J 7/0063; H02M 7/5387; H02M 1/14; B64D 31/14
See application file for complete search history.

(56) References Cited

U.S. PATENT DOCUMENTS 6,242,883 B1 * 6/2001 Strunk ............... H02M 7/5387
318/767
7,619,906 B2 * 11/2009 Schnetzka ........... H02M 5/4585
363/68

(Continued)

FOREIGN PATENT DOCUMENTS

DE  102015206627 A1  1/2016
EP  0588628 A1  3/1994

(Continued)

OTHER PUBLICATIONS

German Search Report for German Application No. 10 2018 201 202.4 dated Apr. 13, 2018.

(Continued)

*Primary Examiner* — Muhammad S Islam
(74) *Attorney, Agent, or Firm* — Lempia Summerfield Katz LLC

(57) ABSTRACT

The invention relates to a circuit arrangement of a converter (1) for the electrical supply of a multi-phase electric motor (2). The arrangement comprises multiple DC-voltage-supplied (+DC, −DC) phase intermediate circuits (13) and multiple inverter circuits (5) that are electrically connected to each phase intermediate circuit (13), wherein a respective phase intermediate circuit (13) and inverter circuit (5) are provided for each phase, together forming a commutation cell (14). The invention also relates to an aircraft having a circuit arrangement of this type, and an operating method with a circuit arrangement of this type.

14 Claims, 4 Drawing Sheets

(51) Int. Cl.
*B64D 31/14* (2006.01)
*H02M 1/14* (2006.01)
*H02P 27/06* (2006.01)

(56) References Cited

U.S. PATENT DOCUMENTS

| | | | | |
|---|---|---|---|---|
| 2010/0090659 A1* | 4/2010 | Sellin | ............... | H01M 10/6571 |
| | | | | 320/152 |
| 2012/0092915 A1* | 4/2012 | Okuda | ................. | H02M 7/501 |
| | | | | 363/132 |
| 2015/0343911 A1* | 12/2015 | White | ................... | H02M 7/487 |
| | | | | 318/400.29 |
| 2015/0364799 A1* | 12/2015 | Miller | ................. | H01M 10/425 |
| | | | | 320/108 |
| 2016/0144732 A1* | 5/2016 | Ramraika | ............... | B60L 53/22 |
| | | | | 320/109 |
| 2017/0244248 A1* | 8/2017 | Flett | ......................... | H02J 3/00 |
| 2017/0317576 A1* | 11/2017 | Shen | ...................... | H02M 7/49 |

FOREIGN PATENT DOCUMENTS

| | | | |
|---|---|---|---|
| EP | 2648321 A1 | 10/2013 | |
| EP | 3093972 A1 | 11/2016 | |

OTHER PUBLICATIONS

International Search Report and the Written Opinion for International Patent Application PCT/EP2018/084193 dated Apr. 2, 2019.

* cited by examiner

CIRCUIT ARRANGEMENT FOR A CONVERTER, METHOD FOR OPERATING A CONVERTER AND AIRCRAFT HAVING A CIRCUIT ARRANGEMENT OF THIS TYPE

This application is the National Stage of International Application No. PCT/EP2018/084193, filed Dec. 10, 2018, which claims the benefit of German Patent Application No. DE 10 2018 201 202.4, filed Jan. 26, 2018. The entire contents of these documents are hereby incorporated herein by reference.

FIELD

The present embodiments relate to electrically supplying a multiphase electric motor.

BACKGROUND

A power converter that uses an AC voltage or DC voltage to produce an AC voltage, the frequency and amplitude of which are varied, is referred to as a converter (e.g., an inverter). Converters are often in the form of AC/DC-DC/AC converters or DC/AC converters, where an output AC voltage is produced from an input AC voltage or an input DC voltage via a DC voltage link circuit and clocked semiconductors.

FIG. 1 illustrates a block diagram of an exemplary AC/DC-DC/AC converter 1, in which a three-phase input voltage $U_1$ is formed into a three-phase output voltage $U_2$ in order to drive an electric motor 2. The converter 1 has a rectifier circuit 3, a link circuit 4, and an inverter circuit 5. The rectifier circuit 3, the link circuit 4, and the inverter circuit 5 are controlled by a control circuit unit 6. The published patent application DE 10 2015 206 627 A1 discloses such a converter 1.

FIG. 2 shows a block diagram of a conventional DC/AC converter 1 having a casing 7 or a structural frame in which the components are accommodated. The important structural power-electronic components include the power semiconductor switches 8, the link circuit 4, and the control logic circuit 9. The power semiconductor switches 8 have a low inductance and are therefore connected spatially very close to the link circuit 4. There is one link circuit 4 for each converter 1, and the link circuit may include a plurality of connected capacitors in order to meet all voltage and current-carrying requirements that cannot be met by individual capacitors.

The individual components of converters 1 are generally inside a casing 7 that hermetically delimits the environment. Applications in electrically driven aircraft demand a high degree of failure safety of the converters 1.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a solution for converters and operation of the converters that provides a high degree of failure safety with a low weight is provided.

In one or more of the present embodiments, separation of a converter output stage in phase-selective commutation cells with phase link circuits is provided. The phase link circuits may optionally be combined by a collective link circuit. The separated individual components may be constructed as structural individual elements and be connected to one another.

According to one or more of the present embodiments, the link circuit is divided into a plurality of individual link circuits that are separated from one another (and are therefore electrically decoupled with respect to the functionality of an individual large link circuit capacitor). Each phase of the electric motor receives its "own" link circuit. A collective link circuit may parallelize the individual phase link circuits, with the result that there is only "one" link circuit with a high-voltage connection coming from the high-voltage battery, as previously. Depending on the requirement, it is also possible to dispense with the collective link circuit.

If the link circuit is divided into individual phase link circuits, the voltage ripple increases compared with a common link circuit seen by an HV battery (e.g., requirements are directed to limiting this ripple to a certain value). The collective link circuit reduces this ripple. This is therefore a question of optimization. It is possible to add the collective link circuit, but obtaining a "common cause", the arrangement is weight-optimized, however, in conjunction with error rates that are simultaneously reduced. Alternatively, the collective link circuit is omitted; the phase link circuits are then to be given larger dimensions (e.g., become heavier), although the reliability of the overall system becomes optimal.

In the case of H-bridges, the ripple is reduced somewhat compared with selective half-bridge link circuits. Therefore, the collective link circuit may be dispensed with. However, there is always a weighing up between weight and reliability.

This separation results in the following consequences that implement essential properties of the present embodiments: The individual phases are structural individual modules with their own casing that may be arranged radially. For all individual phase modules, there is a control unit that is likewise accommodated in an additional casing and may be situated inside the outer ring formed by the radially arranged individual phases.

The present embodiments include a circuit arrangement of a converter for electrically supplying a multiphase electric motor. The circuit arrangement includes a plurality of DC-voltage-supplied phase link circuits and a plurality of inverter circuits electrically connected, respectively, to a phase link circuit. A respective phase link circuit and inverter circuit are present for each phase, and jointly form a commutation cell.

One or more of the present embodiments afford the advantage that it is possible to provide a converter having a high degree of failure safety with an optimized weight.

In one development, the circuit arrangement includes a collective link circuit, to which the phase link circuits are connected in parallel.

In a further embodiment, the inverter circuit may be formed by power semiconductor switches in a half-bridge circuit.

In a further embodiment, the inverter circuit is formed by power semiconductor switches in an H-bridge circuit.

In one development, the phase link circuit may include at least one first capacitor.

In one development, the collective link circuit may include at least one second capacitor.

In a further embodiment, the circuit arrangement may include a control logic circuit that may control the inverter circuits.

In a further configuration, the circuit arrangement may include a fuse circuit (e.g., an explosive fuse) that is connected to the phase link circuit on the input side and may disconnect the associated commutation cell abruptly from the DC voltage if required (e.g., in the case of a disturbance).

In one development, a central control unit electrically connected to the control logic circuit may be present, which drives the control logic circuit.

The present embodiments also include an aircraft including an arrangement according to an embodiment. The aircraft includes at least one electrically driven engine supplied by the circuit arrangement.

The present embodiments also include a method for operating a circuit arrangement according to an embodiment. A polyphase AC voltage of variable amplitude and frequency is generated from a DC voltage.

In one development of the method, an electric motor may be supplied with the AC voltage.

DETAILED DESCRIPTION

According to the present embodiments, an output stage pairing of link circuit power semiconductors of a converter is divided into a plurality of individual elements. Each individual element of the plurality of individual elements corresponds to a commutation cell for a motor phase. In this case, the commutation cell may be in the form of a half-bridge circuit (FIG. 3) or an H-bridge circuit (FIG. 4). A collective link circuit then connects the individual commutation cells to form an overall link circuit from the point of view of a high-voltage source. A central control component (e.g., a central control unit) controls the commutation cells.

The individual capacitances (e.g., first capacitors) of the commutation cells are kept small in order to save weight and volume. The function of the individual capacitances involves implementing a weakly inductive commutation cell of the respective phase. There are no ripple voltage requirements inside the converter that would result in an increase in the individual capacitances. The collective capacitance (e.g., a second capacitor) buffers individual phase ripples and is used as a high-voltage bus that implements a connection with a predefinable maximum ripple with respect to +DC and −DC. The overall capacitance including parallel circuits of the second capacitor and the first capacitors is intended to be similar to an overall capacitance of conventional converters.

Figure 1:
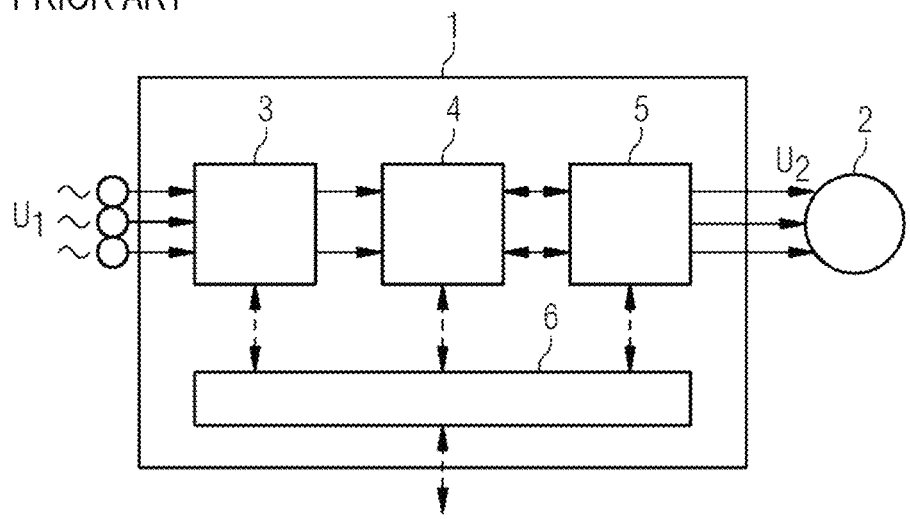
FIG. 1 shows a block diagram of an AC/DC-DC/AC converter according to the prior art.
Figure 2:
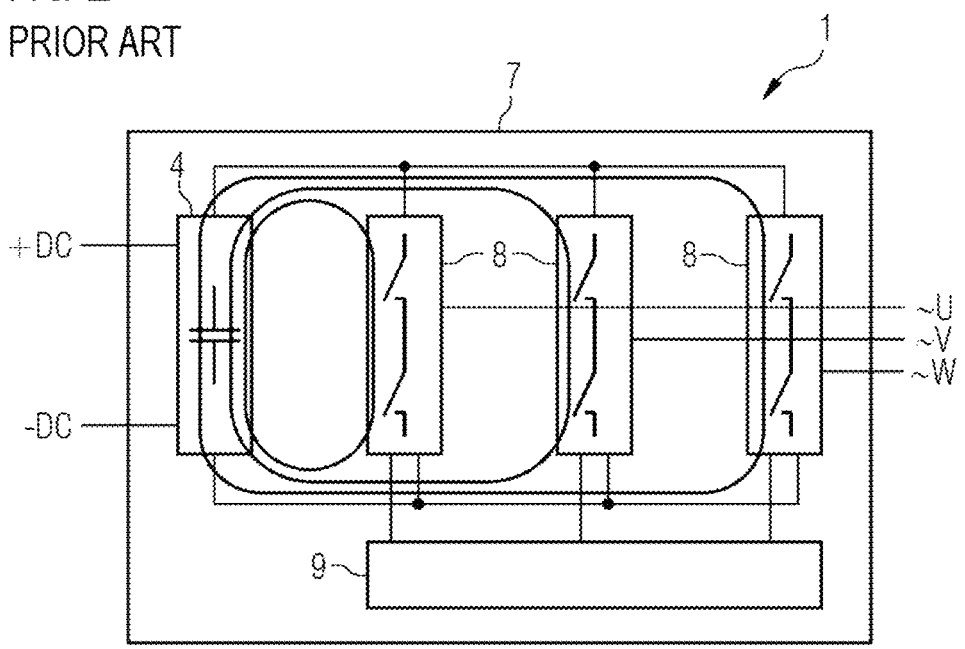
FIG. 2 shows a block diagram of a DC/AC converter according to the prior art.
Figure 3:
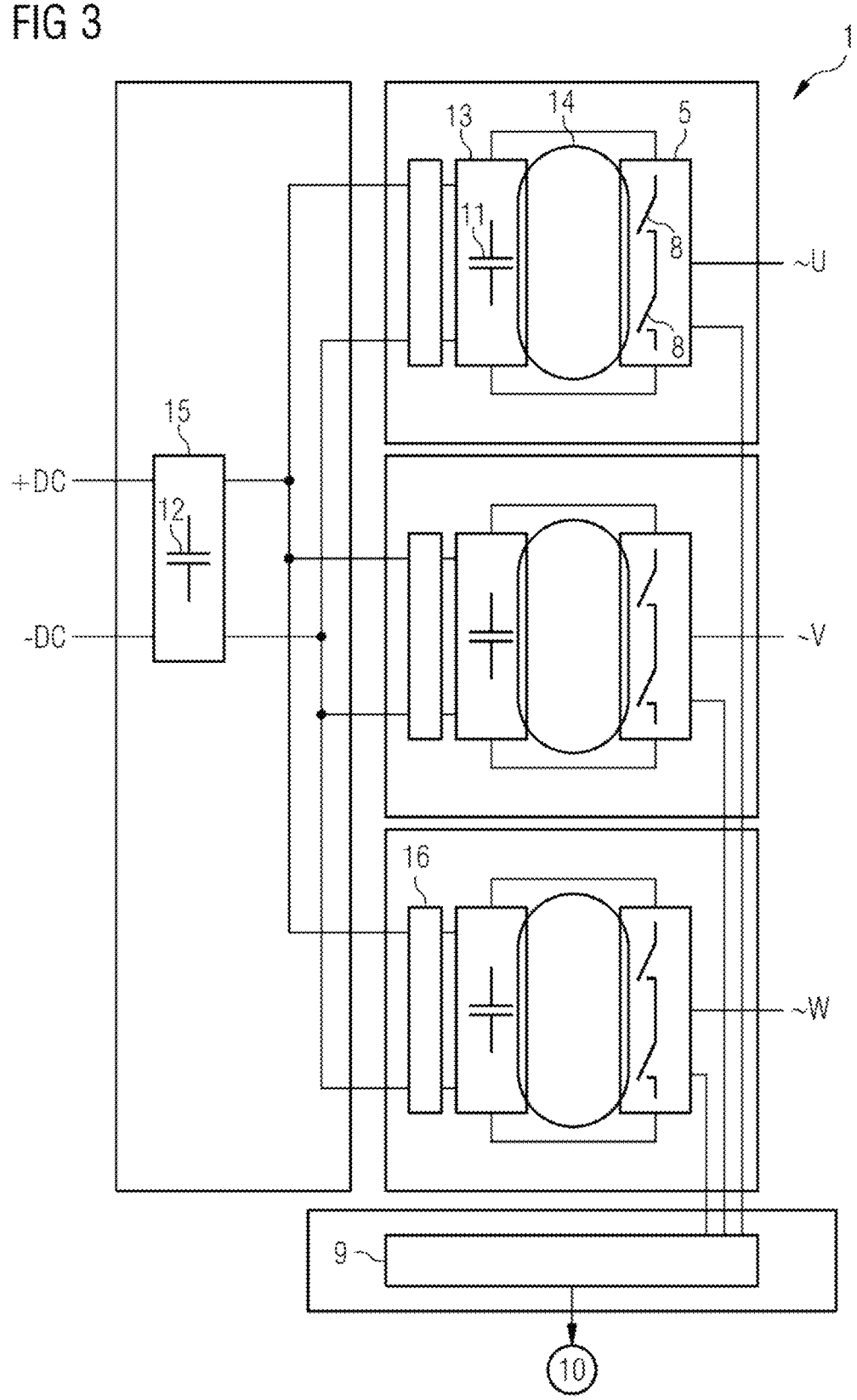
FIG. 3 shows a block diagram of one embodiment of a DC/AC converter having phase link circuits and having a collective link circuit.
Figure 4:
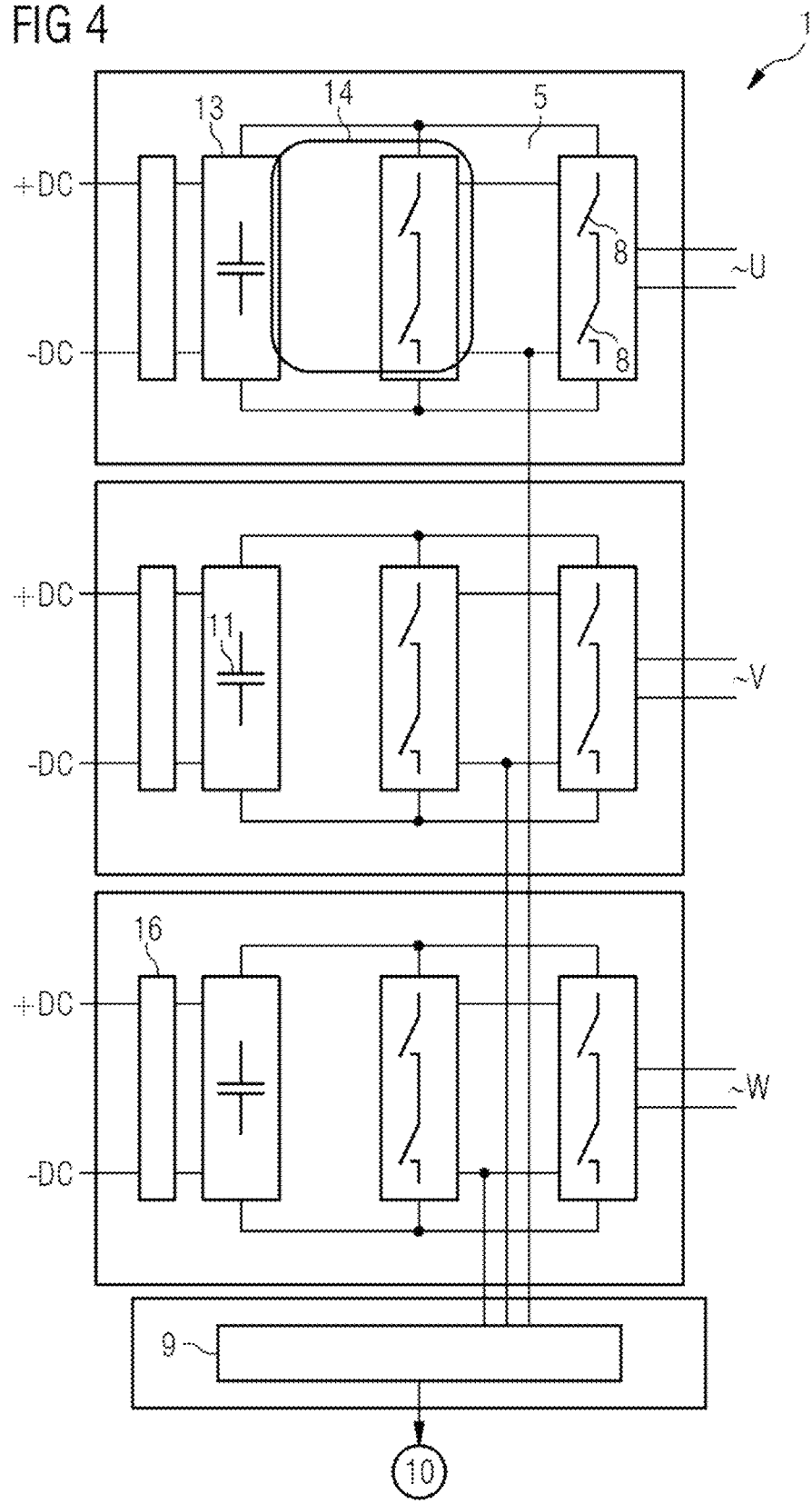
FIG. 4 shows a block diagram of one embodiment of a DC/AC converter having phase link circuits.

FIG. 3 shows a block diagram of one embodiment of a converter 1 that is electrically supplied with the DC voltage +DC, −DC (e.g., from a rechargeable battery). A collective link circuit 15 having one or more second capacitors 12 distributes the DC voltage +DC, −DC to the commutation cells 14 of the three phases. Each commutation cell 14 has a phase link circuit 13 and an inverter circuit 5 connected thereto. The phase link circuit 13 has at least one first capacitor 11. The inverter circuit 5 has the power semiconductor switches 8 in the form of a half-bridge for forming the AC voltages ~U, ~V and ~W.

The three phases of an electric motor may be supplied with the AC voltages ~U, ~V and ~W. The inverter circuits 5 are supplied with the aid of a control logic circuit 9 that switches, for example, the power semiconductor switches 8 on and off. The control logic circuit 9 is connected to a central control unit 10 that is not illustrated.

Fuse circuits 16 that, in the event of a fault inside such a phase to be separated, may abruptly disconnect a phase from the DC supply +DC, −DC may be respectively connected upstream of the phase link circuits 13.

FIG. 4 shows a block diagram of a converter 1 that is electrically supplied with the DC voltage +DC, −DC (e.g., from a rechargeable battery). The DC voltage +DC, −DC is distributed (e.g., without a collective link circuit) to the commutation cells 14 of the three phases. Each commutation cell 14 has a phase link circuit 13 and an inverter circuit 5 connected thereto. The phase link circuit 13 has at least one first capacitor 11. The inverter circuit 5 has the power semiconductor switches 9 in the form of an H-bridge for forming the AC voltages ~U, ~V and ~W.

The three phases of an electric motor may be supplied with the AC voltages ~U, ~V and ~W. The inverter circuits 5 are supplied with the aid of a control logic circuit 9 that switches, for example, the power semiconductor switches 8 on and off. The control logic circuit 9 is connected to a central control unit 10 that is not illustrated.

Fuse circuits 16 that, in the event of a fault inside such a phase to be separated, may abruptly disconnect a phase from the DC supply +DC, −DC may be respectively connected upstream of the phase link circuits 13.

The following advantages are afforded for the operation of the converters 1 according to the present embodiments. For the elements now separated, new, selective protection and failure scenarios that limit a failure to one of these elements and thus reduce the probability of total failure of the converter 1 may be configured.

In the case of the embodiment of the output stage as an H-bridge and of the electric motor with separate individual phases, a three-phase electric motor with an H-bridge may be regarded as completely failure-tolerant with respect to single faults. A second converter or a six-phase electric motor is no longer required. In the case of a half-bridge configuration, this may likewise be realized with appropriate design (e.g., increased dimensioning of the single-phase link circuit and omission of the collective link circuit).

In terms of performance, the discontinuation of a phase would be noticed. In other words, the possible power that may be provided via the converter and may then be output by the motor decreases somewhat. However, this may be somewhat compensated for again by measures, such that the failure of an H-bridge does not result in the reduction of the power output to $2/3$, but rather, is somewhat above that.

The following advantages are afforded for development and system architecture. The individual elements may be provided with fixedly defined interfaces, which facilitates a system-side fragmentation and enables a scaling across orders of magnitude. For example, a control unit may be developed once so as then to be reused 1:1 (e.g., if appropriate in a different casing) for a 30 kW or 300 kW drive, for example.

The following advantages are afforded for manufacturing and procurement. It is customary for the converter to be manufactured with the many different components and processes normally by a manufacturer that, in the vertical value chain, purchases partial components and then tests the partial components in entirety, packages the partial components, and dispatches the partial components. This may now be divided among the newly proposed individual components with a reduced vertical range of manufacture in each case. An increase in the number of units also results owing to scaling effects.

Figure 5:
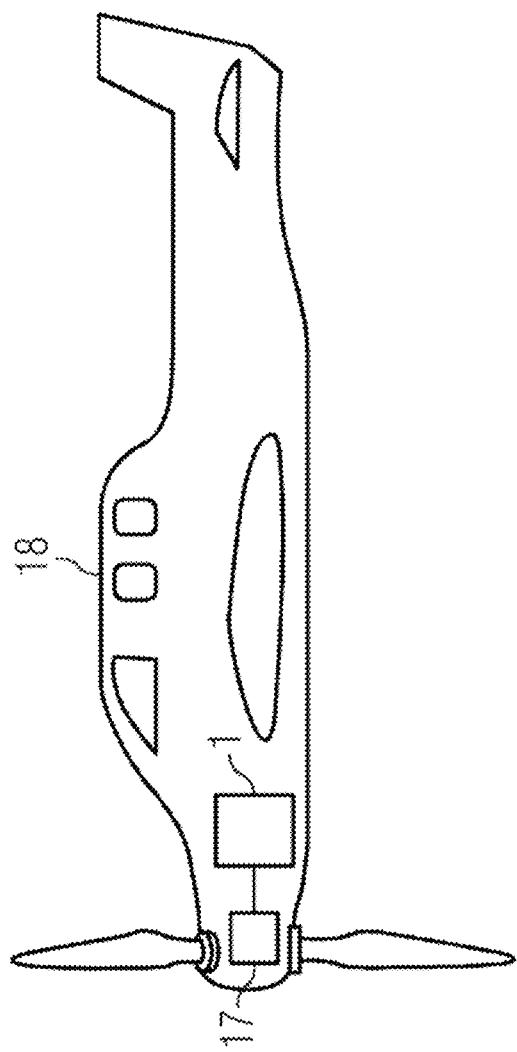
FIG. 5 shows a block diagram of one embodiment of an electrically driven flying vehicle.

FIG. 5 shows a block diagram of one embodiment of an aircraft 18 (e.g., a propeller airplane) having a converter arrangement according to FIG. 3 or FIG. 4, where the circuit arrangement of the converter 1 supplies an electrically driven engine 17 with electrical energy. The engine 17 is, for example, a propeller driven by an electric motor.

Although the invention has been described and illustrated more specifically in detail by the exemplary embodiments, the invention is not restricted by the disclosed examples, and other variations may be derived therefrom by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A circuit arrangement of a converter for electrically supplying a multiphase electric motor, the circuit arrangement comprising:
   a plurality of phase link circuits, the plurality of phase link circuits being DC voltage supplied;
   a plurality of inverter circuits electrically connected to the plurality of phase link circuits, respectively, wherein a respective phase link circuit and inverter circuit are present for each phase and jointly form a commutation cell; and
   a fuse circuit directly connected to a phase link circuit of the plurality of phase link circuits on an input side, the fuse circuit being configured to disconnect the associated commutation cell from the DC voltage, wherein each phase link circuit of the plurality of phase link circuits has at least one capacitor.

2. The circuit arrangement of claim 1, further comprising:
   a collective link circuit, to which the plurality of phase link circuits are connected in parallel.

3. The circuit arrangement of claim 1, wherein an inverter circuit of the plurality of inverter circuits is formed by power semiconductor switches in a half-bridge circuit.

4. The circuit arrangement of claim 1, wherein an inverter circuit of the plurality of inverter circuits is formed by power semiconductor switches in an H-bridge circuit.

5. The circuit arrangement of claim 1, further comprising:
   a control logic circuit configured and programmed to control an inverter circuit of the plurality of inverter circuits.

6. The circuit arrangement of claim 2, wherein the respective at least one capacitor is at least one first capacitor, and wherein the collective link circuit has at least one second capacitor.

7. An arrangement comprising:
   a circuit arrangement of a converter for electrically supplying a multiphase electric motor, the circuit arrangement comprising:
      a plurality of phase link circuits, the plurality of phase link circuits being DC voltage supplied;
      a plurality of inverter circuits electrically connected to the plurality of phase link circuits, respectively, wherein a respective phase link circuit and inverter circuit are present for each phase and jointly form a commutation cell, and wherein each phase link circuit of the plurality of phase link circuits has at least one capacitor;
      a fuse circuit directly connected to a phase link circuit of the plurality of phase link circuits on an input side, the fuse circuit being configured to disconnect the associated commutation cell from the DC voltage; and
      a control logic circuit configured and programmed to control an inverter circuit of the plurality of inverter circuits; and
   a central control unit electrically connected to the control logic circuit and configured and programmed to drive the control logic circuit.

8. The arrangement of claim 7, wherein the circuit arrangement further comprises a collective link circuit, to which the plurality of phase link circuits are connected in parallel.

9. The arrangement of claim 7, wherein an inverter circuit of the plurality of inverter circuits is formed by power semiconductor switches in a half-bridge circuit.

10. The arrangement of claim 7, wherein an inverter circuit of the plurality of inverter circuits is formed by power semiconductor switches in an H-bridge circuit.

11. The arrangement of claim 8, wherein the respective at least one capacitor is at least one first capacitor, and wherein the collective link circuit has at least one second capacitor.

12. An aircraft comprising:
   an arrangement comprising:
      a circuit arrangement of a converter for electrically supplying a multiphase electric motor, the circuit arrangement comprising:
         a plurality of phase link circuits, the plurality of phase link circuits being DC voltage supplied;
         a plurality of inverter circuits electrically connected to the plurality of phase link circuits, respectively, wherein a respective phase link circuit and inverter circuit are present for each phase and jointly form a commutation cell, and wherein each phase link circuit of the plurality of phase link circuits has at least one capacitor;
         a fuse circuit directly connected to a phase link circuit of the plurality of phase link circuits on an input side, the fuse circuit being configured to disconnect the associated commutation cell from the DC voltage; and a control logic circuit configured and programmed to control an inverter circuit of the plurality of inverter circuits; and a central control unit electrically connected to the control logic circuit and configured and programmed to drive the control logic circuit; and at least one electrically driven engine supplied by the circuit arrangement.

13. A method for operating a circuit arrangement of a converter for electrically supplying a multiphase electric motor, the circuit arrangement comprising a plurality of phase link circuits, the plurality of phase link circuits being DC voltage supplied, and a plurality of inverter circuits electrically connected to the plurality of phase link circuits, respectively, and a fuse circuit directly connected to a phase link circuit of the plurality of phase link circuits on an input side, the fuse circuit being configured to disconnect the associated commutation cell from the DC voltage, wherein a respective phase link circuit and inverter circuit are present for each phase and jointly form a commutation cell, and wherein each phase link circuit of the plurality of phase link circuits has at least one capacitor, the method comprising:

generating a polyphase AC voltage of variable amplitude and frequency from the DC voltage.

14. The method of claim 13, further comprising electrically supplying the multiphase electric motor with the polyphase AC voltage.

* * * * *